July 2, 1968  G. A. HENRY  3,390,581
PUSHBUTTON TUNER

Filed May 11, 1966  10 Sheets-Sheet 1

INVENTOR
GEORGES A. HENRY
BY
Abraham A. Saffitz
ATTORNEY

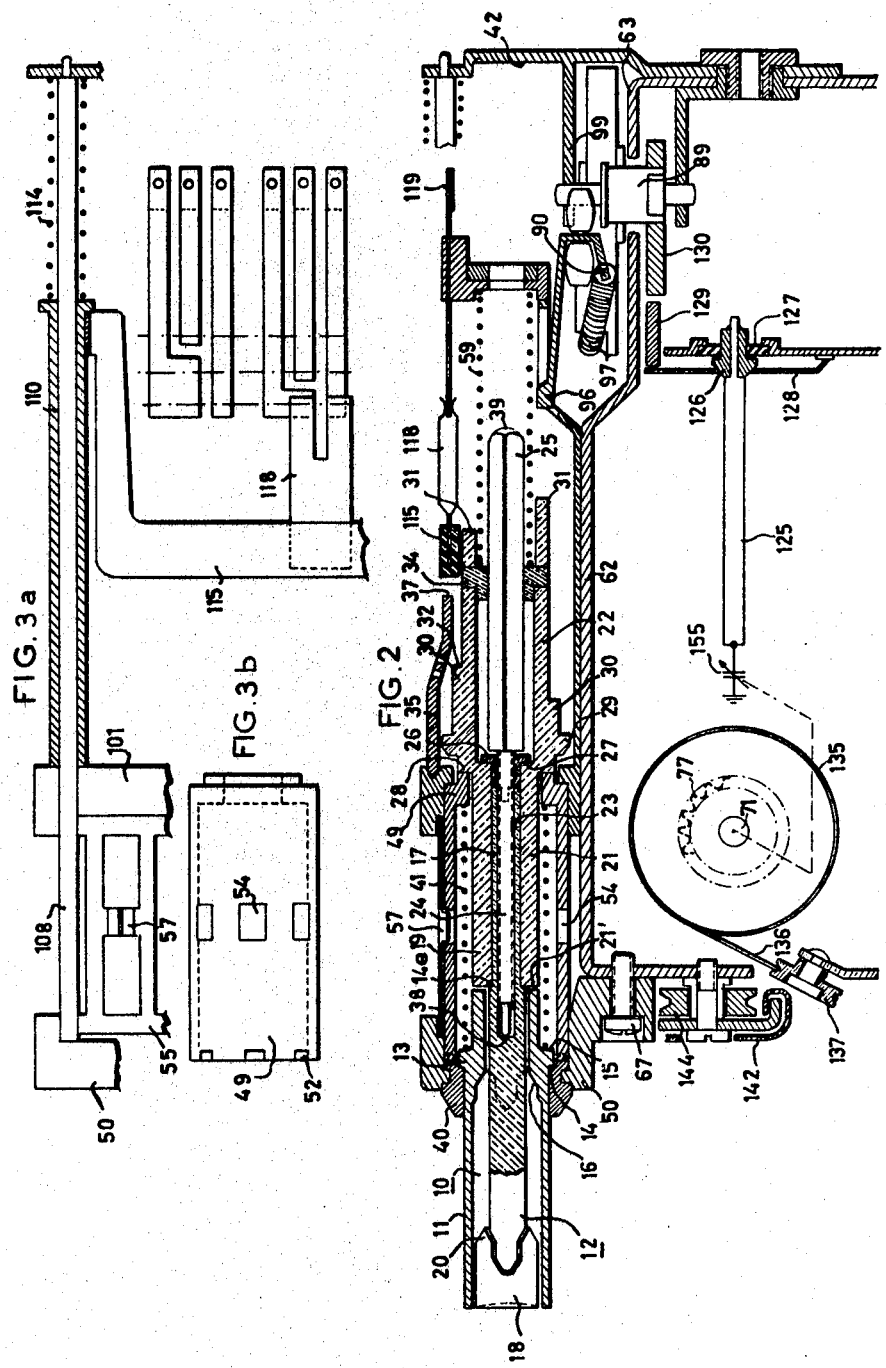

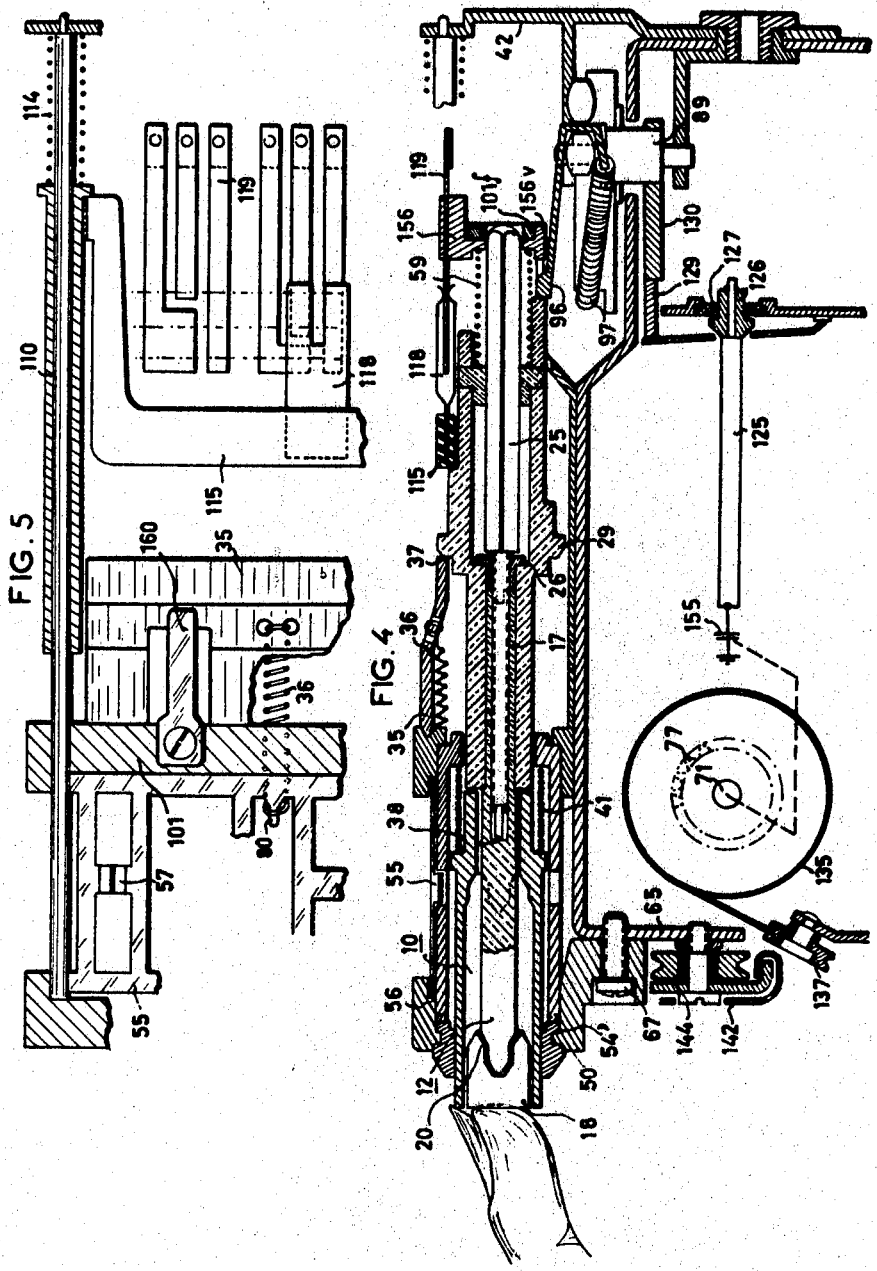

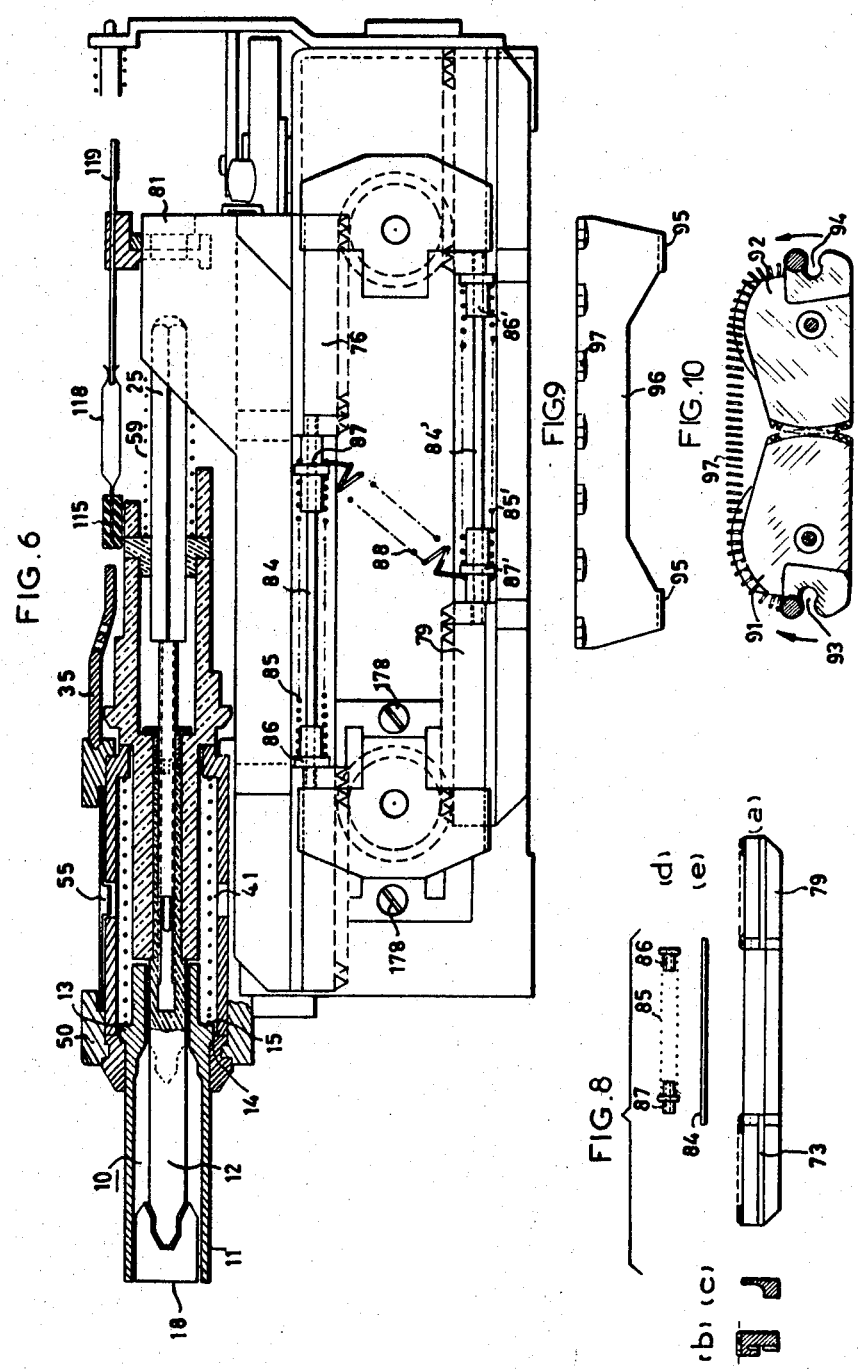

July 2, 1968   G. A. HENRY   3,390,581
PUSHBUTTON TUNER
Filed May 11, 1966   10 Sheets-Sheet 5
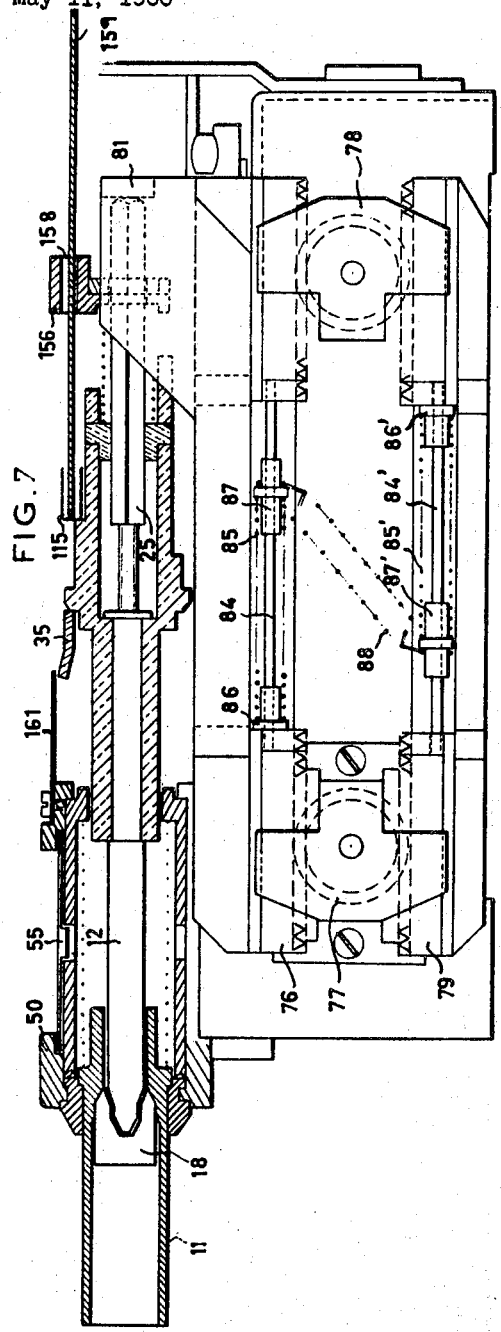
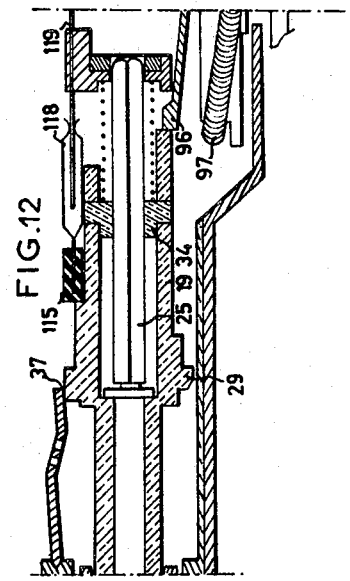
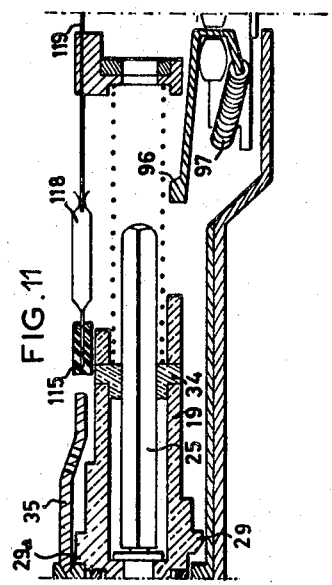
INVENTOR
GEORGES A. HENRY
BY
Abraham A. Saffitz
ATTORNEY

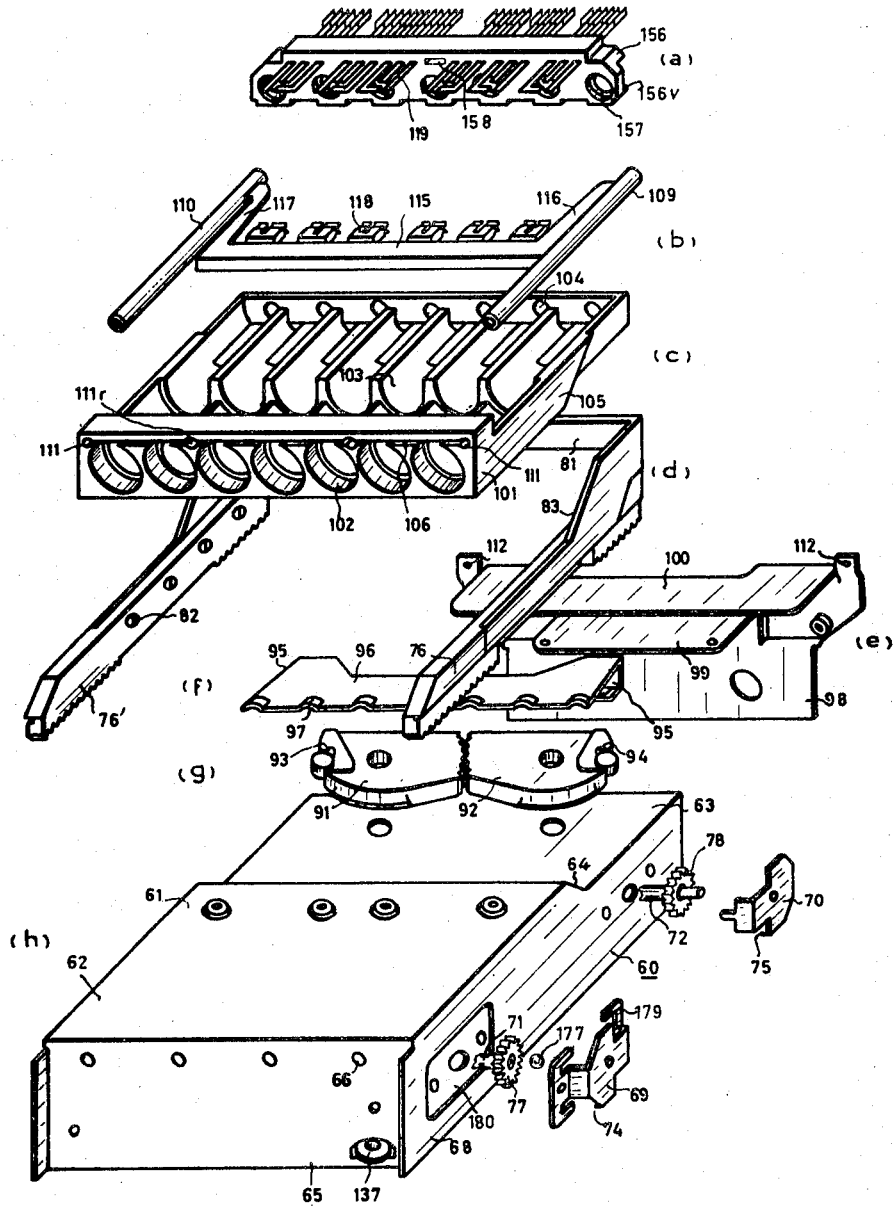

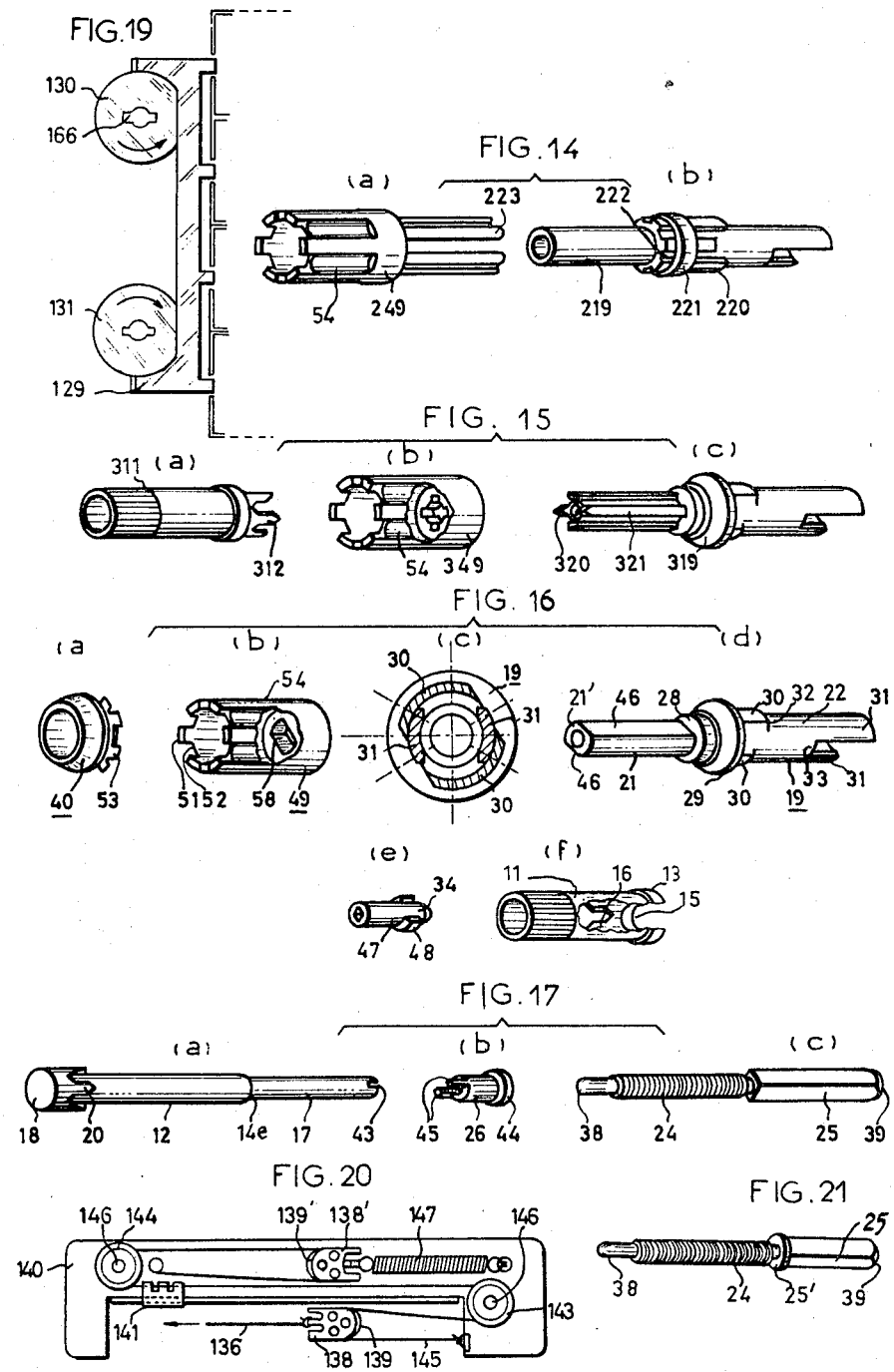

July 2, 1968  G. A. HENRY  3,390,581
PUSHBUTTON TUNER
Filed May 11, 1966  10 Sheets-Sheet 9
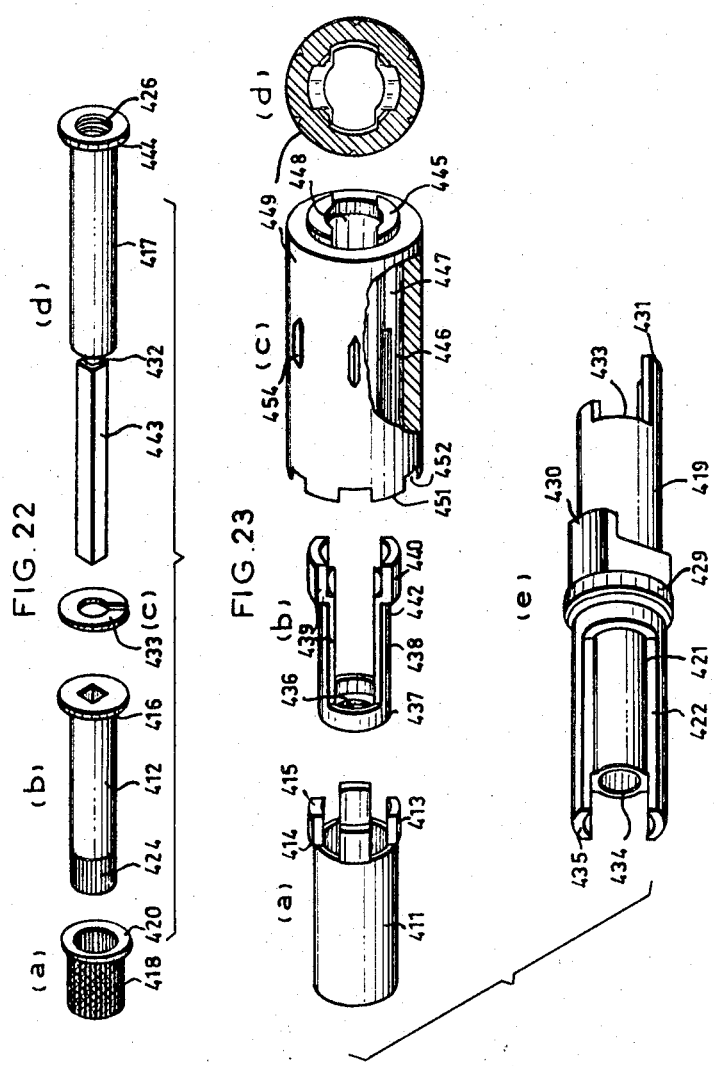
INVENTOR
GEORGES A HENRY
BY
Abraham A. Saffitz
ATTORNEY July 2, 1968   G. A. HENRY   3,390,581
PUSHBUTTON TUNER
Filed May 11, 1966   10 Sheets-Sheet 10
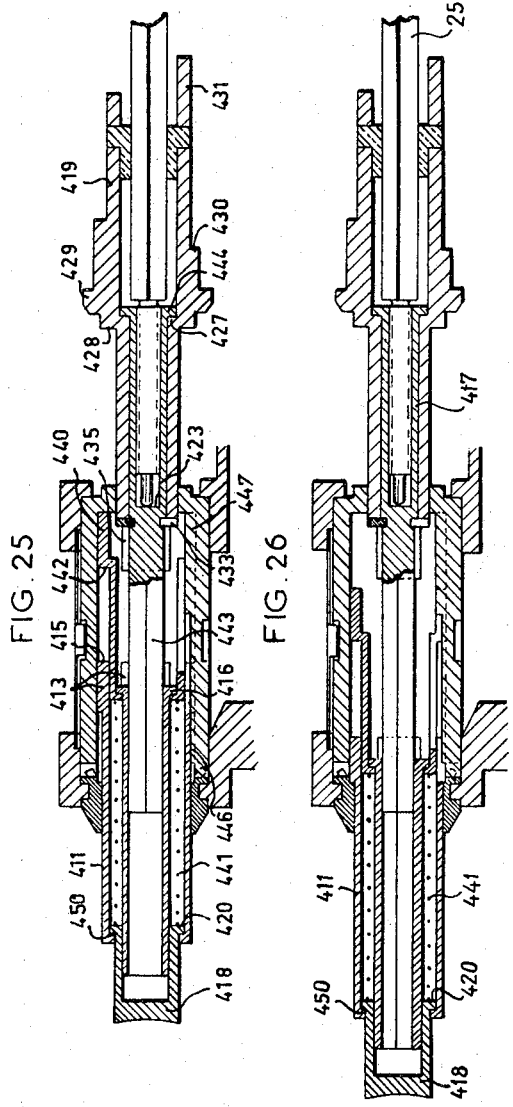
INVENTOR
GEORGES A HENRY
BY
Abraham A. Saffitz
ATTORNEY United States Patent Office 3,390,581
Patented July 2, 1968

3,390,581
PUSHBUTTON TUNER
Georges A. Henry, 19 Rue Folletiere,
Draguignan, France
Filed May 11, 1966, Ser. No. 549,395
Claims priority, application France, May 12, 1965,
16,805
7 Claims. (Cl. 74—10.27)

ABSTRACT OF THE DISCLOSURE

A multiple selection pushbutton device for radio and television apparatus comprising a plurality of pushbuttons, pushrods aligned with these pushbuttons and having adjustable lengths, caps respectively associated with the pushbuttons, sliding thereon and turning freely in relation thereto in an unengaged position and driving ther rotationally in an engaged position. A turret is coaxial with each of the pushbuttons, and can be rotated therewith. A plurality of radial cams on the turret have different axial extensions, and a plurality of elongated tails are provided in the turret. A first switch controlled by a first control bar cooperates with the radial cams, and a second switch controlled by a second control bar cooperates with the tail extensions, and a control member controlling the position of variable electric elements is situated in the path of the pushrods. The position of the first control bar depends on the axial extension of the cam cooperating therewith; the position of the second control bar depends on the extension of the tail cooperating therewith and the position of the control member depends on the length of the pushrod cooperating therewith.

---

The present invention relates to a device comprising multiple selection pushbuttons for radio apparatus, and more particularly to a device comprising channel selection pushbuttons for multi-standard television sets.

It is known that television transmitters differ from one another by the frequency of the image carrier wave, which may be either a very high frequency (VHF) of the bands I (41–68 mc./s.) and III (163–216 mc./s.) or an ultar-high frequency (UHF) of the bands IV (470–606 ms./s.) and V (606–960 mc./s.), and it is well known that they may differ by their standard, the main characteristics of which are the definition or number of lines, the direction of image modulation, and the sound modulation system.

The result is that multi-standard receivers require numerous circuit switching arrangements, and it is known that they are generally equipped with a VHF selector comprising perregulated circuits controlled by a rotary multi-point switch, a UHF tuner, a VHF–UHF change-over switch, a definition change-over switch, and two separate indicator dials.

This television control device is very bulky and expensive because of its heterogeneous nature. In addition, it requires a duplication of operative elements, tubes or transistors, of the mixer and oscillator input stage.

The object of the invention is to provide a device comprising multiple selection pushbuttons which is in a single piece and compact in form and in which tuning to a given transmitter, whatever its frequency band and its standard, is effected by means of pushbuttons each of which effects all the necessary switching operations.

It will appear that a device of this type is also suitable for certain radio sets, for example motor vehicle sets, AM–FM receivers, and generally for transmitters and receivers in which operation involves a selection among a plurality of numerous pre-tuned circuits or among a plurality of numerous switching positions.

When applied to television, the present invention has as object a multiple selection device controlled by pushbuttons, in which the pushing-in of a button immediately and directly provides the reception of the corresponding transmitter by simultaneous action on the adjustment of the tuning circuits and on the various switches and indicator dials.

Each button permits the coverage of the entire frequency band selected and may be preadjusted at will to any station.

Figure 1:
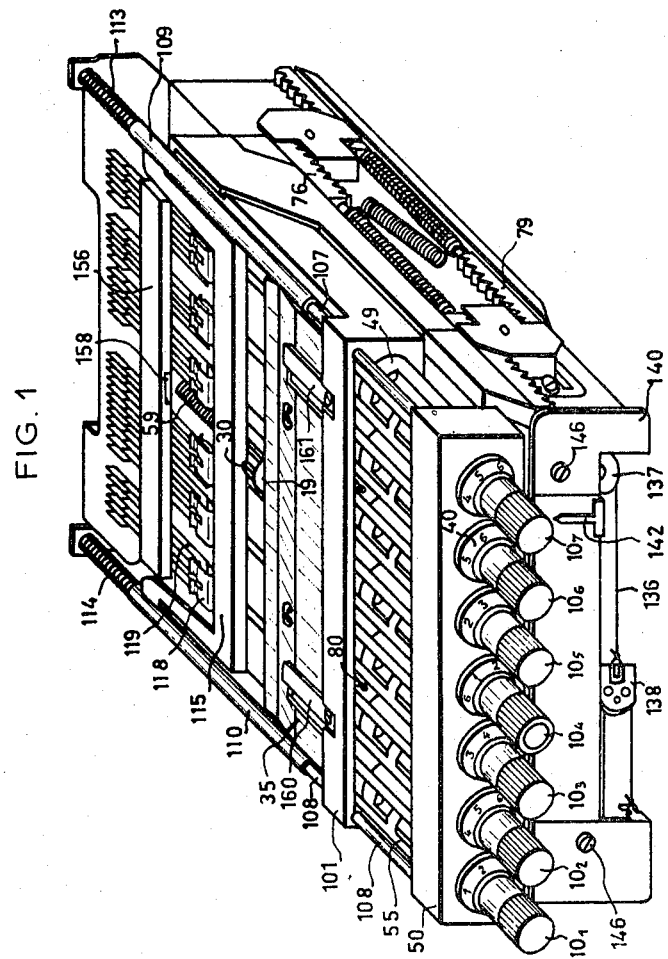
Figure 18:
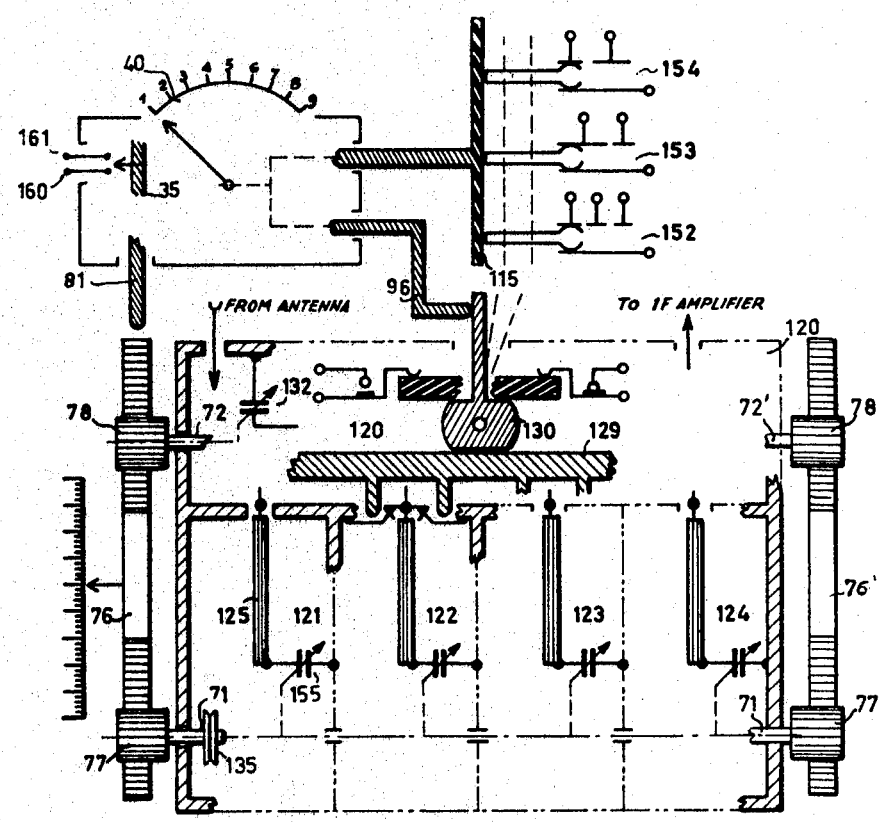

Other objects and advantages of the present invention will be seen from perusal of the following description of one preferred and several alternative examples of construction, said description being given in conjunction with the accompanying drawings, in which:

FIGURE 1 illustrates in perspective the pushbuton device for adjusting and controlling a television set according to the invention, FIGURE 2 is a section of a pushbuton and its mechanism in the position of rest, FIGURES 3a and 3b are front elevations of a barrel, a spring in the form of a grid co-operating with said barrel, and a sliding contact switch of the so-called clip type, said switch being in the position corresponding to the position of rest in FIGURE 2, FIGURE 4 is a section through a pushbutton and its mechanism, in the position in which said button is pushed in, FIGURE 5 illustrates in front elevation the spring grid cooperating with the barrels, a clip type switch in the position corresponding to the engaged pushbutton of FIGURE 4, the locking bar, and its spring attached to the aforesaid spring grid, and a circuit closure spring tongue, FIGURE 6 illustrates in section a pushbutton and its mechanism, and in elevation the rack and pinion type tuning system in the case where the pushbutton is at rest, FIGURE 7 illustrates in section a pushbutton and its mechanism and in elevation the aforesaid tuning system in the case where the pushbuton is pushed in, FIGURES 8a, 8b, 8c, 8d, and 8e illustrate in elevation and in section one of the racks and the parts for guiding and attaching the rack return springs, FIGURE 9 illustrates the band switch control flap, FIGURE 10 illustrates the toothed sector mechanism forming part of the band switch, FIGURES 11 and 12 illustrate a particular turret having means for unlocking the general interlock plate, FIGURE 13 is in exploded view of the casing and various parts of the selection device according to the invention, FIGURES 14a and 14b illustrate the component parts of a first type of barrel and turret, FIGURES 15a 15b, 15c illustrate the component parts of a second type of pushbutton cap, barrel, and turret, FIGURES 16a, 16b, 16c, 16d, 16e, 16f illustrate the component parts of a third type of pushbutton, FIGURES 17a, 17b, 17c illustrate the piston, its locking nut, and the pushrod of the pushbuttons of different models, FIGURES 18 and 19 illustrate diagrammatically part of the electric circuits, the cams, and the pushrod of the band switch, FIGURE 20 illustrates the mechanism for operating the indicator pointer, FIGURE 21 illustrates an alternative form of pushrod, FIGURES 22a, 22b, 22c, 22d, and 23a, 23b, 23c, 23d, and 23e illustrate the component parts of a different type of pushbutton mechanism, FIGURE 24 is a section of the aforesaid mechanism in the position of rest, FIGURE 25 is a section in the operative position of said mechanism, and FIGURE 26 is a section in the operative and easy adjustment position.

Referring first to FIGURE 1, the entire selection device can be seen. In the example described it comprises seven pushbuttons $10_1$ to $10_7$. These pushbuttons may be pushed into a position in which they are operative, but an open cap surrounding the actual pushbutton and following it when pushed in returns to its starting position when the pushbutton is operated. The end of the actual button, which hereinafter will be referred to as a "piston," advantageously has its head coloured differently from the colour of the cap; the result is that the operator can distinguish an inoperative button from an operative button through the fact that in the first case the coloured head of the piston is flush with the open end of the cap, whereas when a button is operated this coloured head is invisible. In FIGURE 1 the button $10_4$ is operative.

When a button is operated, the pushrod terminating said button bears against a tuning control bar 81 which connects two racks 76 situated on the side faces of the casing. These racks drive two pinions mounted on the ends of the adjusting shaft of the radio frequency tuning devices of the selector.

It will also be found that the part 19, hereinbelow referred to as the "turret," when driven by the pushbutton bears by its indentations or bosses 30 against a switch control bar 115 controlling a standard change-over switch. On this control bar 115 sliding contacts 118 are fixed which grip fixed contacts 119. The pushing-in of a button thus brings the standard switch into one particular position amongst a plurality of possible positions, and simultaneously, by means which are not visible in FIGURE 1, brings a band switch into one of the three positions required to cover the UHF–VHF bands.

The buttons are adapted to slide freely in cones 40 and barrels which serve to guide them. These cones 40 are solid to the barrels. Referring now to FIGURES 2 and 16a to 16f, the button is designated generally by 10. It comprises a tubular cap 11 in the form of an open tube in which a piston 12 is adapted to slide. The outer cylindrical wall of the cap 11 is provided with a collar 13, the top shoulder 14 of which abuts against the base of the indicator cone 40 under the action of a compression spring 41 which bears against the bottom shoulder 15 of the collar. The interior of the cap is smooth over part of its height and near its rear portion the cap has teeth 16 in relief, which form one of the two parts of a dog clutch.

The piston 12 (FIGURES 17a, 17b, 17c) comprises a rod 17 ending in a head 18 the appropriate diameter of which enables it to slide freely in the cap; the transition between the head 18 and the rod 17 has a toothed profile 20 forming the aforesaid dog-clutch together with the inside teeth 16 on the cap; this dog-clutch is in engagement in the operative position, as will be seen further on.

This same piston 12 is axially connectable to a cylindrical member or turret 19. This turret 19 (FIGURE 16d) is bored to two different diameters 21 and 22. The rod 17 of the piston 12 penetrates into the portion 21 of the turret, a shoulder 14e on said rod bearing against the front edge 21' of the turret 19. In the rod 17 an axial threaded hole 23 is provided which receives the threaded tail 24 of a pushrod 25. On this threaded tail there is screwed a collar unit 26 (FIG. 17b) the rim of which is applied against a shoulder 27 inside the turret 19 (FIGURE 2) when the threaded tail 24 is screwed into the hole 23. This nut 26 has the purpose of making the rod 17 axially solid to the turret 19. As will be seen later on, the nut 26 and the rod 17 are integral in rotation.

The outside profile of the turret 19 (FIGURES 2, 4, and 16d) comprises a shoulder 28, a collar 29, longitudinal thickenings forming indentations or bosses 30, and tails 31. The number of indentations 30 is variable and depends on the switching operations to be effected; in FIGURES 16c and 16d two diametrally opposite indentations have been illustrated: they are of different lengths, so that the shoulders or steps 32 which they form are at different axial distances from the collar 29. The tails 31 are for example two in number (FIGURE 16d); they are of different lengths and are separated by windows 33 in which there is inserted a part 34 having a square aperture and intended to guide the pushrod 25, which is likewise of square section. This part 34 (FIGURE 16e) has the purpose of preventing any relative rotation of the pushrod and turret 19.

When the button is pushed in, the collar 29 bears against an interlock plate 35. This plate is pivoted in relation to the frame of the selector and it is held in its mountings by a spring 36 (see FIGURES 4 and 5). When the collar 29 passes beyond the level of the bottom edge 37 of the plate 35, the button is engaged through the fact that said edge is supported on the top rim of the collar. This engagement is terminated when another button is pushed in. This system of engagement of the buttons and of disengagement by reciprocal action of the buttons is moreover known in itself and does not need further description.

At the stage of the description which has now been reached, and anticipating the description of general operation given further on, it will be seen that when at rest the cap is free to turn and that when the button is in the engaged position the cap drives it in rotation through the action of the dog-clutch 16, 20. If the cap is turned, the piston 12 is turned, while the pushrod 25, which is prevented from rotating by the guide part 34, is displaced longitudinally. The travel of this pushrod is limited either by the end 38 (FIGURE 17c) of its threaded portion abutting in the bottom of the hole 23, or by the end 39 of its square portion against the control bar 81 in its deep down position (in said position, control bar 81 strikes wall 42 of the frame of the apparatus). The piston 12 and the turret 19 then become integral in rotation and the continuation of the rotation of the cap then entails the rotation of the assembly comprising the piston, turret, barrel, and indicator cone. This results in a change of the tooth 30 cooperating with the moving element 115 of the auxiliary switch and a change of the tail 31 cooperating with the band switch control flap 96.

FIGURES 16a to 16f and 17a to 17c illustrate in perspective the different parts of a pushbutton. It is possible to recognize the piston 12, its rod 17 and its head 18, the indentations 20 at the bottom of the head, the shoulder 14c and two notches 43 at the end of the rod 17. On the right of the piston 12 there is shown (FIGURE 17b) the locking nut 26 having the rim 44. This nut has two teeth 45 which are inserted in the notches 43 on the rod 17 so that the latter and the nut will be integral in rotation and remain contiguous. The result is that as long as the threaded tail 24 remains screwed both into the rod 17 and into the nut 26, the piston 12 is captive on the turret 19.

On the right of the nut 26 there is shown (FIGURE 17c) the pushrod 25 of square section with its threaded tail 24, the end 38 of which is unthreaded and is markedly rounded so that after the piston and the turret have been made integral in rotation by the abutment of the end 38 against the bottom of the hole 23 they are easily disunited in rotation by rotation in the opposite direction of the piston 12 since the end 38 does not remain jammed against the bottom of the hole 23.

FIGURES 16c and 16d illustrate the turret 19 in section and in perspective respectively. It is seen that the portion 21 has a circular profile having two flats 46 with the object of making the turret and barrel integral in rotation. The shoulder 28 which bears against the bottom periphery of the barrel, the collar 29 serving for engagement of the button, the two indentations 30 and the two tails 31 can also be seen. FIGURE 16c shows that the periphery of the turret comprises six sectors in which the combination of a boss 30 and a tail 31 is different, thus corresponding to six different switching combinations for the operation of the standard and band change-over switches.

FIGURE 16e illustrates the guide part 34 having a square aperture; it is provided with a cylindrical stem 47 intended to penetrate into the portion 22 of the turret 19, and two lugs 48 of such a nature as to be able to be inserted between the two tails 31 on the turret 19.

FIGURE 21 illustrates an alternative form of the pushrod 25, which is in all respects identical to the model illustrated in FIGURE 17c, with the exception of a stop collar 25′ intended to hold the pushrod captive inside the portion 22 of the turret by means of a suitable guide part 35 glued (or crimped) between the tails 31. Although these features make no change to the operation, they may be advantageous for assembly purposes.

The pushbuttons 10 slide in barrels 49 (FIGURES 3a, 3b, and 16b) which are mounted in alignment and parallel to one another in a mounting bar 50 pierced with holes which receive their front ends and in a socketed base 101 (FIGURE 13c) the holes 102 of which receive their rear ends. The front edge of the barrels 49 is provdied with teeth 51 (FIGURE 16b) separated by windows 52. The stem of the cones 40 is provided with claws 53. During mounting inside the bar 50, half of these claws, that is to say every other claw, is folded over at right angles outwards, as seen at 54′ in FIGURE 4. The other half of the claws 53 which are not folded over engage in the windows 52. The result is that the barrels and cones are integral in rotation.

The barrels are provided with longitudinal grooves 54 on their outer cylindrical wall. A spring 55 in the form of a flat ladder is disposed in a plane tangent to all the barrels. The uprights of the ladder 55 engage in two rectilinear grooves, one of which 56 (FIGURE 4) is provided in the rear side of the assembly bar 50 while the other groove 106 (FIGURE 13) is provided in the front side of the socketed base 101. Between the bars of the spring and in the middle there are disposed members 57 in the form of a dihedron or wedge, each of which penetrates into a longitudinal groove 54 in a barrel 49. Because of the elasticity of the spring 55, as soon as the movement of rotation of a barrel attains a certain torque, the dihedron-shaped member 57 escapes from the groove 54 in which it is received and the barrel can then assume another angular position defined by a new insertion of the member 57 in another groove 54 in the barrel.

The rear portion of the barrel is pierced with an aperture 58 (FIGURE 16b), the profile of which is the same as the cross-section of the barrel 21 of the turret, in order to make the barrel and the turret integral in rotation.

A spring 59 working by compression and bearing on the one hand against the guide part 34 and on the other hand against the support 156 (FIG. 4) of the fixed contacts 119 serves to restore the button mechanism to rest. It will be recalled that the spring 41 had the object of returning the pushbutton cap 11 to its initial position when the operator ceases to press against the assembly comprising the cap and the piston in order to facilitate adjustment.

FIGURE 13h illustrates the casing 60 intended to contain the active and inactive elements of the VHF and UHF circuits. It has a general parallelepipedic shape and its bottom 61 has two levels 62 and 63 connected by a sloping edge 64. The front face 65 is pierced with threaded holes 66 (FIGURE 13h) intended for the fastening by means of screws 67 (FIGURES 2 and 4) of the assembly bar 50, which in turn is pierced with appropriate holes similarly spaced. On the side face 68 and on the other parallel side face which is not visible in FIGURE 13h there are fixed stirrup-shaped parts 69, 70 serving both as a ball bearing for the shaft 71 driving the variable capacitors and another shaft 72 (FIGURE 18) and as a retaining guide for the pair of racks 79. As illustrated in FIGURES 8a and 8b, for the purpose of this last function the racks 79 are provided with a longitudinal groove 73 into which the edges 74 and 75 of the stirrups penetrate; the stirrups contain between themselves and the side flanks 68 of the casing 60 the pinions 77 and 78 which are mounted on the shafts 71 and 72; balls 177 are housed at the end of the shafts 71 between the pinions 77 and the stirrups 69, the latter serving as a ball thrust adjustable by the screws 178 (FIGURE 6); two sockets 180 are provided on the two sides 68 to receive the four feet 179 of each stirrup 69; these sockets 180, which are of suitable depths, enable the racks 76 and 79 to be guided between the walls 68 and the stirrups 69 and 70.

The racks 76 and 76′ (FIGURE 13d) are fixed by the screws 82 to the side uprights of control bar 81 against which one of the selected pushrods 25 comes to bear for the purpose of driving it.

These two racks 76 and 76′ are therefore solid to one another; they engage in particular with the pinions 77 situated on the two side faces 68 of the casing 60. These two pinions 77 being locked on the same shaft 71, this results in constant parallelism between the control bar 81 and the starting plane constituted by the bottom 101f of the socketed base 101, of the push-rods 25 (FIGURE 4), whatever the travel of the latter and whichever pushbutton is selected (geometrically speaking).

Since meshing play is incompatible with the aforesaid parallelism and consequently with accuracy of regulation, two racks 79 are designed to cooperate in obviating this play and ensuring smooth and correct operation, as will be described later on.

The system for returning to rest the assembly formed by the stop 81 and the two racks 76 and 76′ is illustrated in FIGURES 6, 7, and 8a to 8e.

The racks 76 and 79 have two toothed end portions the section of which is shown by FIGURE 8b and a central portion which is not toothed and the section of which is shown by FIGURE 8c.

The racks 76 and 79 have open sockets on the opposite side to the toothing, into which sockets the ends of rods 84 and 84′ (FIGURE 8e) serving as guide for springs 85 and 85′ can be inserted. These springs bear against two slides 86 and 87 respectively on the one hand and 86′ and 87′ on the other hand. The slide 87 of the rod 84 associated with the rack 76 and the slide 87′ of the rod 84′ associated with the rack 79 are connected by a spring 88. The system of springs 85, 85, and 88 constitutes in particular a zeroising system for the control bar 81 and for the tuning members when the pushbuttons are released. Since the stroke of a pushbutton is in practice of the order of 15 millimeters, if the spring 88 had been anchored to fixed points on the rods 84 and 84′, it would have been necessary for the spring to have an operative elongation excessive with respect to its length at rest. The system comprising three springs and the fastening of the return spring on two slides traveling in opposite directions makes it possible in particular to minimize the return force undergone by the racks when the same are at the end of their course.

Other advantages are immediately clear, particularly: accuracy of regulation through the absence of meshing play (already referred to) however great the wear may be, and, also a very important point, the fact that the two auxiliary racks 79 serve as supports for the fastenings of the two main springs 88 and are supported on the pinions, and that this suport is diametrally opposite to the support of the driving racks 76 and 76′. It follows that the two resultant forces, being equal, cancel one another, so that there is less wear on the ball thrusts.

The advantages of the system described may be summed up as reduced wear and minimum force for pushing in a pushbutton.

On the portion 63 of the casing 60 there are disposed around shafts 89 (FIGURES 2 and 4), two toothed sectors 91 and 92 meshing with one another (FIGURE 10). Each of these toothed sectors has a suitable notch 93 and 94 respectively, and the folded edges 95 of the flap 96 (FIGURES 9 and 13f) can be inserted with considerable play in these notches. A spring 97 fixed to the ends of the flap 96 and passing into peripheral grooves in the toothed sectors tends to turn them in the direction indicated by the arrows in FIGURE 10. This rotational movement however is limited by a stop (not illustrated) and by the natural position at rest of the cams 130 and 131 (FIGURE 19) which are respectively mounted on the shafts 89 of the sectors 91 and 92.

The anchorage 90 of the spring 97 (FIGURE 2) to the bottom ends of the rim of the flap 96 housed in the notches 93, 94 tends to raise the front edge of the flap 96. This front edge is provided with suitable ribs, which face the tails 31. As the turrets have two tails 31 separated by windows 33, the flap 96 can assume three different positions in the axis of the pushrods 25.

It should be noted that the clearance of the flap 96 in the notches 93 and 94 in the toothed sectors 91 and 92 enables it to pivot slightly. The usefulness of this arrangement will be explained later on.

The plate 98 (FIGURE 13e), which has two bends 99 and 100 at right angles, and which serves mainly as a bearing for one of the ends of the spindles 89 of the toothed sectors and of the guide rods 107 and 108, can be screwed on the rear face of the casing 60.

The assembly comprising the control bar 81 and the racks 76 having been placed in position, the socketed base 101 is fixed on the top of the casing 60. This base has holes 102, into which, as has already been seen, the rear ends of the barrels 49 are inserted, and a slot 106 into which the edge of one upright of the ladder spring 55 is inserted. The base has in addition sockets 103 in which the turrets of the pushbuttons are received. The rear face of the base is pierced with holes 104 which serve for the passage of the pushrods 25. The side faces 105 have a shoulder the profile of which is adapted to the sloping surface 83 of the flanges of the control bar 81.

The top portion of the base 101 is pierced in its slot 106 with holes 111r intended for the passage of the springs 36 anchored to the operating plate 35 at one of their ends and by the other end to suitable studs 80 (FIGURES 1 and 5) provided on the uprights of the spring 55; the object of this feature is convenience of assembly and security of the fastening means.

Rods 107 and 108, on which guide tubes 109 and 110 (FIGURES 1 and 13b) are adapted to slide, are fixed in the holes 111 in the base 101 on the one hand and in the holes 112 in the part 98 on the other hand (FIGURE 13e). Springs 113 and 114 (FIGURE 1) surrounding the rods 107 and 108 urge the tubes towards the front of the base. These last-mentioned rods (FIGURE 3a) are adapted to pass through the base and be received in appropriate holes provided at the ends of the grooves 56 in the bar 50, thus providing accurate seating or positioning of said bar and at the same time forming two reliable stops at the ends of the spring 55.

The moving element 115 provided with two uprights 116 and 117 of spring metal at right-angles is welded by the ends of said uprights to the two tubes 109 and 110; it carries insulated sliding contacts 118 which cooperate electrically with the fixed contacts 119 of the auxiliary switch. It should be noted that because of the elasticity of the uprights 116 and 117 and because of the character of the clip contacts 118, the moving element can be displaced upwards in relation to the plane of the rods 107–108.

The contacts 119 are fixed on the insulating support 156 (FIGURE 13a) which is made solid to the base 101 by the pressure of the seven springs 59 which push it towards the bottom of the base. The springs are supported on the bottom of suitable sockets 157 opposite the holes 104 in the base 101, thus permitting the free passage of the push-rods 25; pins 156v lock the support 156 to the base 101, as the sectional view in FIGURE 4 clearly shows. This method of rapid fastening is very convenient.

The interior of the casing illustrated diagrammatically in FIGURE 18 comprises a VHF compartment 120 and four UHF compartments 121–124 disposed side by side. Each UHF compartment comprises in particular a line element 125 and a variable capacitor 155.

Each line element 125 has at its base a cone 126 of conductive precious metal (FIGURES 2 and 4) which is embedded in an insulating base 127 fastened to the frame of the apparatus. A spring blade 128, likewise of conductive precious metal, is welded (in this example) on one side to the casing of the apparatus; it is provided with a suitable hole surrounding the cone and its free end is controlled by a part 129. This part 129, comprising a plurality of push-rods, is operated by two cams 130 and 131 (FIGURES 2, 4, 18, and 19) which are keyed on the shafts 89 of the toothed sectors 91 and 92. These shafts 89 may for example be provided with flats engaging in the toothed sectors and in the cams for facility of assembly, and in order to provide the indispensable synchronism.

It must also be understood that the part 129 may be suitable for controlling different types of switches which will be used by the VHF part of the present device. Thus, for a certain position of the toothed sectors, the part 129 moves the spring blades 128 away from the cones 127 and the line elements 125 are no longer connected to the frame of the apparatus. It has previously been seen that there were three positions of the band-switch, namely one UHF position and two VHF positions. The case of FIGURES 2 and 19, where contact is made between the spring blades 128 and the cones 126, corresponds to the UHF position; the case of FIGURE 4 corresponds to one of the VHF positions.

The shaft 71 drives the variable capacitors 155. Advantage may be taken of the presence of the shaft 72 and 72′ to control variable reactors (inductors or capacitors 132) included in the tuning circuits or a potentiometer controlling variable capacitance diodes also included in the tuning circuits.

The indicator dial is illustrated in FIGURES 1, 2, 4, and 20.

A pulley 135 driving the indicator dial is mounted on the shaft 71. As the shaft 71 is the shaft controlling variable capacitors 155, it can make only a half-turn. The dimensions of the apparatus do not make it possible to give the pulley a sufficient diameter to enable its half-perimeter to correspond to a suitable displacement of the dial pointer. Means are provided to amplify the movement of the pointer in relation to the half-perimeter of the pulley.

At a point on the periphery of the pulley 135 there is fastened a cable 136 which passes over a guide pulley 137 (FIGURES 1, 2, and 4) and is fastened to the block 138 of a moving pulley 139 (FIGURE 20). The dial comprises a frame 140, on one of the folded-over edges of which a slide 141 carrying a pointer 142 is adapted to slide. On the frame there are disposed two pulleys 143 and 144, the fastening screws of which also serve to fasten the dial-casing by means of suitable tubes. A cable 145 is anchored at one of its ends to the frame 140, passes over the pulley 139 mounted in the block 138, and then over the pulley 143, is then anchored to the side 141, passes over the pulley 144 and over the pulley 139′ mounted in the block 138′ and is finally anchored to the frame at its other end. The block 138′ is connected to the frame by a spring 147. The assembly of the two block pulleys 139 and 139′ recalls the technique of pulley-blocks, and the result is that the displacement of the pointer 142 is twice as great as the displacement of the cable 136. The desired amplification of movement is thus obtained.

In FIGURES 3a and 5 it is possible to see the arrangement of the fixed contact blades 119 of the auxiliary switch which makes it possible to effect switching to three positions 152, 153, 154 (FIGURE 18). It is not impossible that other types of switches better suited to certain switching operations could entirely or partly replace the arrangement illustrated in FIGURE 18 without thereby departing from the scope of the present invention.

A multistandard television set or certain apparatus, particularly radiogoniometers, could advantageously utilize rotatable loop or antenna systems having predetermined radiation direction and connectable to the apparatus by action of a triggering pulse; the following arrangement relating to the triggering pulse of the aforesaid systems is simple and inexpensive: the interlock plate 35 of the pushbutton mechanisms is urged upwards by the collar 29 of the turret 19 whenever a button is pushed in; this brief departure from its initial position is substantially of the same duration as that of the pulse necessary for the control of these rotatable antenna systems. The simplicity resides in the momentary closure of a triggering circuit by the contact spring blades 160 and 161 and the plate 35 of conductive metal (FIGURES 5, 7, and 18). It is obvious that in this case the socketed base 101 is of plastic material.

FIGURES 11 and 12 show that in order to obviate the accident of general engagement of all the pushbuttons, it is possible to provide on one of the turrets a collar 29 having a suitable boss 29a, in one or two positions of the six permitted by the barrels. It will easily be understood that, even when operated, the pushbutton connected to said turret can bring the latter into the general disengagement position. There will be no need whatsoever to dismantle the apparatus in the event of the locking of the pushbuttons.

Models of pushbuttons and barrels which are different from that illustrated in FIGURES 16a to 16f are illustrated in FIGURES 14a, 14b and 15a to 15c.

In FIGURES 14a and 14b, the turret 219 has bosses 220 in the form of regular ribs distributed equiangularly around it and enclosed by an operating ring 221. Beneath the ring and between the ribs 220, numerous tongues 223 on the barrel 249 are inserted with slight play in the cavities 222. The cap is the same as that in FIGURE 16f, which engages with the piston in the operating position. The only difference is the rotational driving of the barrel by the turret. Both in FIGURES 16a to 16f and in FIGURES 14a and 14b, the cap is loose when at rest and the selection and adjustment of the channel and standard is effected with the pushbutton in the pushed-in position.

In FIGURES 15a to 15c the cap 311 is provided, not only with the bottom teeth which together with the teeth of the head 18 form a dog clutch, but also with a second set of teeth 312 which together with the teeth 320 situated at the end of grooves 321 carried by the turret 319 forms a second dog clutch. The barrel 349 is similar to the barrel 49 with the only exception that the profile of the opening at its base is suitable for the cross-sectional profile of the turret 319.

In this new formula, the pushbutton is integral in rotation with the turret and the barrel both in the rest and push-in positions. Accordingly, the selection and adjustment of the channel and the standard can be effected by turning the pushbutton in its rest position and it is no more necessary to bring in abutment the end of the pushrod. In addition, the caps of the pushbuttons, being engaged on the turrets when at rest, prevent any accidental misadjustment of the buttons at rest when a neighbouring button is adjusted.

It will be very clearly understood that after engagement the cap, returned by its spring, is disconnected from the turret and connected to the piston as previously described in the two preceding formulae. Moreover there is nothing to prevent the teeth 16 of the cap 311 and the teeth 20 of the piston 12 from being sufficiently long and suitable to ensure that the cap and piston will be angularly solid to one another, because the cap is disconnected from the turret in the operated and regulating position.

Although at first sight it appears to be superior, this formula comprising two dog-clutches is desirable only for certain applications other than television sets the users of which tend to turn all the knobs whenever there is the slightest fault. Another alternative consists in engaging the second dog-clutch between the cap 311 and the turret 319 only after the cap 311 has been pushed partly in, in other words to fill in a distance deliberately left between the teeth 312 and 320. Because of the reduced spacing of the pushbuttons, this alternative makes the changing of channel and standard difficult.

Another pushbutton mechanism having the same outline and dimensions as that of the mechanisms already described and thus interchangeable therewith is illustrated in FIGURES 22a to 22c, 23a to 23e, and by FIGURES 24, 25, and 26.

FIGURES 22a, 22b, 22c, 22d and 23a, 23b, 23c, 23d illustrate the new component parts in perspective. FIGURE 24 is a section of the new mechanism in the rest unoperated position. FIGURE 25 is a section of this mechanism in the operated and regulating position. FIGURE 26 is a section of the mechanism in another operated position in which regulation of the length of the pushrod is made easier, which is an important feature of this new alternative. FIGURES 22a to 22c illustrate the actual pushbutton body which comprises a hollow piston head 418 (FIGURE 22a) and a piston 412 (FIGURE 22b); the head 418, provided with a collar 420, is engaged by force over the front end 424, which is knurled for this purpose, of the piston 412 which is pierced by a square hole to receive the square end 443 of the regulating shaft 417. The latter is provided with a groove 432 intended to receive the split spring washer 433. The cylindrical body of the shaft 417 terminates in a collar 444 and is pierced by a tapped hole 426 having a flat bottom 423 (FIGURE 25) cooperating with the conventional pushrods 25.

FIGURE 23a illustrates a new cap 411 provided with an inner collar 450 at the front (FIGURE 25) and four terminal tails 413. These equidistant tails radially overhang the stem of the cap, so that they have front edges 414 and rear edges 415.

FIGURE 23b illustrates an elastic sliding stop 437 of stamped metal, comprising two arms 438 and 439 in the form of sugar tongs, ending in two shouldered parts or projections 440. The front face of this stop is pierced with a round hole 436 of a diameter slightly larger than the diameter of the piston stem 412 which passes through it, before having been engaged by force in the piston head 418. A compression return spring 441 bears simultaneously against the front face of the stop 437 and the rear face of the collar 420 of the head 418. The projections 440 on the stop 437 form rims 442 together with the arms 438 and 439. The lateral parallel edges of the arms 438 and 439 serve to guide the stop 437 in suitable internal grooves in the barrel 449. This barrel is illustrated in perspective in FIGURE 23c and in section in FIGURE 23d. At the front it has teeth 451 and windows 452 identical with the teeth and the windows in the barrel 49 in FIGURE 16b, as well as notches 454; only its interior and its bottom aperture are different; four longitudinal grooves are disposed in the tubular inside surface of the barrel 449. These grooves are separated by ribs 447 which are truncated over part of their length at 446 so as to enable the cap 411 to slide freely. The rear aperture 448 in the barrel is partly masked by two rear half-moons 445.

The aperture 448 has a profile identical with the cross-sectional profile of the front portion of the turret 419, illustrated in FIGURE 23e, which, as in the other examples, is adapted to slide freely inside the barrel while remaining integral in rotation with it; this turret 419 has its rear inside and outside portions bounded respectively by the inside shoulder 427 (FIGURE 25), the collar 429, and the two tails 431 identical with those in FIGURE 16d; its front part is particularly different because of the presence of two other symmetrical tails 435 of radial dimensions identical to those of the tails 413 of the cap 411 and, like them, intended to slide freely in the inside grooves in the barrel 449. The edges 422 have flats parallel and symmetrical to the axial plane of the turret.

The component parts of this new formula of pushbutton mechanism having been described, it is now appropriate to explain the assembly and operation thereof in order to illustrate its advantages.

The regulating shaft 417 is adapted to turn freely inside the turret 419, the shaft and turret being made solid in translation to one another by the elastic washer 433 inserted in the groove 432 and against the front face 434 of the turret.

This assembly, placed in position in the barrel by its rear opening 448, is adapted to slide freely in two first grooves and between the arms 438 and 439 of the moving stop 437, which in turn slides in the two second grooves in the barrel 449; the front portion 443 of the shaft 417 penetrates freely into the interior of the piston 412 which is capped by the cap 411, of which the inside diameter of the stem, including the tails 413, is greater than the diameters of the collar 420 and of the front portion of the movable stop 437; the inside collar 450 of the cap 411 corresponds with slight clearance to the diameter of the head 418 of the piston, the stroke of which inside the cap is limited by its collar 420; the cap 411 slides in the barrel 449 but is integral in rotation therewith through its tails 413 matching the grooves 446.

After the bar 50 provided with the indicator cones 40 has been fixed to the frame of the push-button device, the entire mechanism is able to operate. FIGURE 24 illustrates it in the position of rest.

It is clearly seen that the cap can drive the barrel directly in rotation for the change of channel or standard, but does not serve for tuning as in the other alternatives and in the standard example; when the assembly comprising the cap and the piston is pushed in, the latter through its rear collar 416 pushes the turret 419 by means of the locking washer 433, while the stop 437 is pushed into the bottom of the barrel by the action of the spring 441 which, after engagement (FIGURE 25) returns the piston to its original position; the latter sliding freely inside the cap can in turn drive the latter only by its collar 420 which abuts against the internal collar 450 in the cap, with the result that the head 418 is then uncovered. This condition, which indicates that the selection has been made, permits regulation, which moreover is impossible in the position of rest. This arrangement should be emphasized; the cap which is integral in rotation with the barrel then serves as a means of protection and therefore prevents any accidental misadjustment of a preregulated channel in the position of rest when one of the neighboring push-buttons is selected.

In order to return from the engaged position illustrated in FIGURE 25 to the position of rest illustrated in FIGURE 24, where the cap once again covers the regulating head, assistance was needed from the front tails 435 of the turret, which was returned to its original position by its spring common to all the alternative forms of construction of the pushbutton mechanism and to the standard example; the tails 413 opposite the tails 435 are seen explicitly in FIGURE 25. These tails are in contact in the position of rest of the whole arrangement.

FIGURE 26 illustrates in section a new engaged position in which three parts differently positioned can be seen.

Referring to FIGURE 1, which illustrates in perspective the pushbutton device according to the invention, it will be seen that all the pushbuttons are in the same alignment including the cap of the pushbutton $10_4$ selected. This disadvantage is not serious in the case of a television receiver, because the number of programmes is restricted, the seven buttons being allocated once for all to said programmes, the preregulation of which requires only extremely slight adjustments in some cases. The same is not true of certain other radio apparatus for which the present invention is intended and for which more convenient adjustment may be required.

The arrangement illustrated in FIGURE 26 is explained as follows: after engagement and when the elements are in the state illustrated in FIGURE 25, the uncovered head 418 is pulled and responds to this action, this response being limited only by the front face 414 of the tails 413 of the cap which strikes against the inside face of the stem of the cones 40, of which half of the folded-over claws 53 are supported on the bar 50 (FIGURE 24) fixed to the frame; the movable stop 437 also followed, because nothing prevented this.

The result is that the piston head 418 serving as regulation control emerges from the level of alignment of the other buttons, consequently permitting more convenient adjustment; such adjustment having been made, it will be sufficient to press the assembly comprising the piston head 418 and the cap 411 completely in again to ensure that they will resume the position illustrated in FIGURE 25, including the movable stop 437.

The effects of this last alternative form of pushbutton mechanism are identical to those of the other mechanisms previously described, the barrels 449 and turrets 419 having identical operative parts for the same general function.

The structure of the selection apparatus having been completely described, as well as the various alternative forms of push-button mechanisms, its operation will now be rapidly explained.

At rest (FIGURE 2) the cap 11 is loose in relation to the piston 12.

When the pushbutton is pushed in (FIGURE 4), the turret engages, the cap returns to its original position, the pushrod 25, if it is not at the zero point of its travel, comes to bear against the control bar 81, operating the racks 76 and 76′ and consequently the pinions 77 and 78 and the racks 79. The shaft 71 turns and positions the tuning means, in this case the capacitors 155. It should be observed that the pinions 77 on both sides of the casing are mounted on the same shaft 71, so that it is impossible for the assembly, comprising the control bar 81 and the two racks 76 and 76′ and moreover guided by the sideflanks of the casing 60, to distort and consequently the rotation of the tuning means is not dependent on the eccentricity of the pushbutton operated, in relation to the centre of the control bar 81.

In the course of the pushing-in operation, the tail 31 of the pushbutton, which is in the desired radial direction, comes to bear against the flap 96. The toothed sectors 91 and 92 rotate in opposite directions, which is also true of the cams 130 and 131, and the part 129 (in the VHF position of the band switch) moves the spring blades 128 away from the cones 126.

In the course of this same pushing-in operation, the shoulder 32 of the boss 30 which is in the desired radial direction comes to bear against the moving element 115, and the sliding contacts 118 of the latter assume, in relation to the fixed contacts 119 of the standard switch, one of the three positions illustrated in broken lines in FIGURES 3a and 5.

When the pushbutton previously engaged is disengaged, the turret and the piston return to rest through the action of the spring 59, the moving element 115 returns to rest through the action of springs 113 and 114, and the flap 96 returns to rest through the action of the spring 97.

When it is desired to change the duty of a pushbutton in relation to the band switch and to the standard switch, the cap of the pushbutton is turned into the engaged position until the round head 38 of the threaded tail of the pushrod strikes against the bottom of the hole 23. From that moment the cap causes the piston, turret, barrel, and cone to turn. It may occur that the boss and the tail which were in the operative position, that is to say which bore against the moving element 115 and the flap 96, are to be replaced by another, longer boss and tail. It is therefore necessary for the moving element and the flap to be articulated, that is to say they must be able to move away from their normal position when the turret turns. This point has been emphasised in the foregoing, and it has been shown that this effect was obtained on the one hand through the elastic uprights 116 and 117 and on the other hand through the considerable play between the edge of the flap 96 and the notches in the toothed sectors, these effects moreover providing operational safety ensuring the non-deterioration of the present device if at the beginning or end of its travel it should be forced in an unreasonable manner.

What I claim is:

1. A multiple selection pushbutton device for radio and television apparatus comprising a plurality of pushbuttons, pushrods aligned with said pushbuttons and connected thereto, caps respectively associated with said pushbuttons, sliding thereon and turning freely in relation thereto in an unengaged position and driving them rotationally in an engaged position, means for selectively varying the length of said pushrods, means for selectively rotating and setting said push-rods in predetermined angular positions, a turret coaxial with each of said pushbuttons, means for rotationally engaging said turret and said pushbutton, a plurality of radial cams on said turret having different axial extensions, a plurality of elongated tail extensions provided on said turret, a first switch controlled by a first control bar cooperating with said radial cams, the position assumed by said first control bar depending on the axial extension of the radial cam cooperating with it, a second switch controlled by a second control bar means cooperating with said tail extensions, the position assumed by said second control bar means depending on the longitudinal length of the tail extension cooperating with it, and a control member controlling the position of variable electric elements and situated in the path of the pushrods, the position assumed by said control member depending on the length of the pushrods.

2. A multiple selection pushbutton device for radio and television apparatus comprising a plurality of pushbuttons, pushrods aligned with said pushbuttons and connected thereto, caps respectively associated with said pushbuttons, sliding thereon and turning freely in relation thereto in an unengaged position and driving them rotationally in an engaged position, means for selectively varying the length of said push-rods, means for selectively rotating and setting said push-rods in predetermined angular positions, a turret coaxial with each of said pushbuttons, means for rotationally engaging said turret and said pushbutton, a plurality of radial cams on said turret having different axial extensions, a plurality of elongated tail extensions provided on said turret, a first switch controlled by a first control bar cooperating with said radial cams, the position assumed by said first control bar depending on the axial extension of the radial cam cooperating with it, a second switch controlled by a second control bar means cooperating with said tail extensions, the position assumed by said second control bar means depending on the longitudinal length of the tail extension cooperating with it, an U-shaped control member having a central bar and two side bars, the central bar cooperating with the push-rods and the side bars having formed therein driving toothed racks, a rotating axle controlling the position of variable electric elements and two pinions locked on said axle and in engagement with said racks.

3. A multiple selection pushbutton device for radio and television apparatus according to claim 1 in which the first control bar controlling the first switch and cooperating with the radial cams of the turret carries sliding clip contacts cooperating with fixed contacts mounted on the device frame and is slidably and resiliently connected to said frame by means comprising two side spring blades connected to the bar, two guide rods fixedly connected to the frame, two guide tubes terminating said blades and sliding on said rods and two springs biasing said bar against the turret cams.

4. A multiple selection pushbutton device for radio and television apparatus according to claim 1 in which the control member controls the positioning of variable capacitors each having one terminal earthed and the other terminal connected to one end of a line element, and the second switch comprises a rotatable cam actuated by the second control bar, a pushrod actuated by said cam and means controlled by said pushrod for selectively grounding the second end of the line elements.

5. A multiple selection pushbutton device for radio and television apparatus comprising a plurality of pushbuttons, pushrods aligned with said pushbuttons and connected thereto, caps respectively associated with said pushbuttons, sliding thereon and turning freely in relation thereto in an unengaged position and driving them rotationally in an engaged position, means for selectively varying the length of said pushrods, means for selectively rotating and setting said pushrods in predetermined angular positions, a turret coaxial with each of said pushbuttons, means for rotationally engaging said turret and said pushbutton, a plurality of radial cams on said turret having different axial extensions, a plurality of elongated tail extensions provided on said turret, a hollow cylindrical barrel rotationally solid with respect and coaxial to said turret and having longitudinal grooves on the outer wall thereof, a flat spring disposed in a plane tangent to said barrels having longitudinal wedge portions adapted to be resiliently inserted into said longitudinal grooves, the positions of insertion of said spring wedge portions into said barrel grooves determining the said predetermined angular positions, a first switch controlled by a first control bar cooperating with said radial cams, the position assumed by said first control bar depending on the axial extension of the radial cam cooperating with it, a second switch controlled by a second control bar means cooperating with said tail extensions, the position assumed by said second control bar means depending on the longitudinal length of the tail extension cooperating with it and a control member controlling the position of variable electric elements and situated in the path of the pushrods, the position assumed by said control member depending on the length of the pushrods.

6. A multiple selection pushbutton device for radio and television apparatus comprising a plurality of pushbuttons, pushrods aligned with said pushbuttons and connected thereto, caps respectively associated with said pushbuttons, sliding thereon and turning freely in relation thereto in an unengaged position and driving them rotationally in an engaged position, means for selectively varying the length of said pushrods, means for selectively rotating and setting said pushrods in predetermined angular positions, a turret coaxial with each of said pushbuttons, means for rotationally engaging said turret and said pushbutton, a plurality of radial cams on said turret having different axial extensions, a plurality of elongated tail extensions provided in said turret, a first switch controlled by a first control bar cooperating with said radial cams, the position assumed by said first control bar depending on the axial extension of the radial cam cooperating with it, a second switch controlled by a second control bar means cooperating with said tail extensions, the position assumed by said second control bar means depending on the longitudinal length of the tail extension cooperating with it, an U-shaped control member having a central bar and two side bars having formed therein driving toothed racks, a rotating axle controlling the position of variable electric elements, two pinions locked on said axle and in engagement with said racks, two supplementary racks respectively associated and parallel to said driving toothed racks and engaging said pinions at points respectively diametrically opposite the engagement points of the pinions and the driving toothed racks and two springs connecting one end of a toothed rack to the opposite end of the associated supplementary rack.

7. A multiple selection pushbutton device for radio and television apparatus according to claim 6 in which the driving racks and the associated supplementary racks comprise parallel guiderods, slide members on said guiderods, springs guided on the rods and respectively urging said slide members to opposite sides of the driving and supplementary racks, the spring linking each driving rack to its associated supplementary rack being attached to said slide members.

References Cited

UNITED STATES PATENTS 3,276,274   10/1966   Machts et al. _____ 74—10.27

MILTON KAUFMAN, *Primary Examiner.*